(12) United States Patent
Xia et al.

(10) Patent No.: US 10,642,268 B2
(45) Date of Patent: May 5, 2020

(54) METHOD AND APPARATUS FOR GENERATING AUTOMATIC DRIVING STRATEGY

(71) Applicant: Baidu Online Network Technology (Beijing) Co., Ltd., Beijing (CN)

(72) Inventors: Zhongpu Xia, Beijing (CN); Jinghao Miao, Beijing (CN); Liyun Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 176 days.

(21) Appl. No.: 15/668,137

(22) Filed: Aug. 3, 2017

(65) Prior Publication Data
US 2019/0004517 A1    Jan. 3, 2019

(30) Foreign Application Priority Data
Jul. 3, 2017    (CN) .......................... 2017 1 0532639

(51) Int. Cl.
G05D 1/00    (2006.01)
G05D 1/02    (2020.01)

(52) U.S. Cl.
CPC ......... *G05D 1/0088* (2013.01); *G05D 1/0274* (2013.01); *B60T 2220/02* (2013.01); *B60W 2540/30* (2013.01); *G05D 2201/0213* (2013.01)

(58) Field of Classification Search
CPC ............. B60W 40/09; B60W 2520/10; B60W 2540/10; B60W 2540/12; B60W 2550/308; B60W 2050/146; B60W 2540/20
See application file for complete search history.

(56) References Cited

U.S. PATENT DOCUMENTS

| 2009/0234552 A1* | 9/2009 | Takeda ................. B60W 30/16 701/96 |
| 2017/0267237 A1* | 9/2017 | Oyama ................ B60W 30/12 |
| 2017/0327117 A1 | 11/2017 | Ochi |
| 2017/0369055 A1* | 12/2017 | Saigusa ............ G08G 1/096791 |
| 2018/0105185 A1* | 4/2018 | Watanabe .......... G06K 9/00288 |

(Continued)

FOREIGN PATENT DOCUMENTS

CN    104943684 A    9/2015

*Primary Examiner* — Redhwan K Mawari
(74) *Attorney, Agent, or Firm* — Knobbe, Martens, Olson & Bear, LLP

(57) ABSTRACT

The present disclosure discloses a method and an apparatus for generating an autonomous driving strategy. A specific implementation of the method comprises: measuring state information of an instant vehicle and ambient scene information, the ambient scene information comprising: state information of an impediment vehicle, road structure information, and traffic scene information of the instant vehicle; determining a running track of the impediment vehicle according to the state information of the impediment vehicle within a predetermined period of time; determining a first mapping relation based on the state information of the impediment vehicle within the predetermined period of time and the running track of the impediment vehicle; and generating the autonomous driving strategy of the instant vehicle based on the first mapping relation, the road structure information, the state information of the instant vehicle and the traffic scene information of the instant vehicle.

9 Claims, 6 Drawing Sheets

(56) References Cited

U.S. PATENT DOCUMENTS

2018/0105186 A1* 4/2018 Motomura ............ B60W 50/14
2018/0113461 A1* 4/2018 Potnis .................. G05D 1/0088
2018/0190128 A1* 7/2018 Saigusa .................... G08G 1/22
2018/0275657 A1* 9/2018 You .................... G05B 23/0229

* cited by examiner

METHOD AND APPARATUS FOR GENERATING AUTOMATIC DRIVING STRATEGY

CROSS-REFERENCE TO RELATED APPLICATION

This application is related to and claims the priority from Chinese Application No. 201710532639.8, filed on Jul. 3, 2017, entitled "Method and Apparatus for Generating Autonomous Driving Strategy," the entire disclosure of which is incorporated herein by reference.

TECHNICAL FIELD

The present disclosure relates to the field of computer technologies, particularly to the field of computer network technologies, and more particularly, to a method and apparatus for generating an autonomous driving strategy.

BACKGROUND

As an essential function of an autonomous vehicle, an automatic decision-making function can select corresponding driving strategies based on perceived states of surrounding impediments and corresponding road structures, to ensure driving safety and comfort. During the real driving, there exist diverse road structures and constantly changing traffic scenes. How to make a correct decision in various complex scenes to guarantee the driving safety and comfort is a problem that presently needs to be solved.

Currently, there are two automatic decision-making schemes: one is an expert system scheme, namely automatic decision-making is implemented by extracting corresponding autonomous driving rules based on the expertise of experienced drivers, and triggering the corresponding rules using traffic scenes and road structures where vehicles are. The other one is a machine learning scheme, that is, a mapping relation between traffic scenes and road structures and drivers' decisions is learned using a machine learning model based on driving data collected from experienced drivers.

However, the rules extracted according to the expert system scheme are difficult to encompass all traffic scenes. Particularly, when more and more traffic scenes need to be covered, how to guarantee non-conflicting quadrature of the rules is an arduous task. Whereas in the machine learning scheme, it is required that data must cover enough traffic scenes and road structures. However, when encountering scenes and roads never learned before, this scheme is difficult to guarantee correctness of a decision strategy and the driving safety. Therefore, the existing automatic decision-making schemes are merely applied to simple traffic scenes and are difficult to be used in complex road structures and constantly changing traffic scenes.

SUMMARY

An objective of the present disclosure is to provide an improved method and apparatus for generating an autonomous driving strategy, in order to solve the technical problem mentioned in the foregoing Background section.

In a first aspect, an embodiment of the present disclosure provides a method for generating an autonomous driving strategy, the method comprises: measuring state information of an instant vehicle and ambient scene information, the ambient scene information comprising: state information of an impediment vehicle, road structure information, and traffic scene information of the instant vehicle; determining a running track of the impediment vehicle according to the state information of the impediment vehicle within a predetermined period of time; determining a first mapping relation based on the state information of the impediment vehicle within a predetermined period of time and the running track of the impediment vehicle, the first mapping relation being a mapping relation from the traffic scene information of the impediment vehicle to driving behavior information of the impediment vehicle; and generating the autonomous driving strategy of the instant vehicle based on the first mapping relation, the road structure information, the state information of the instant vehicle, and the traffic scene information of the instant vehicle.

In some embodiments, determining a first mapping relation based on the state information of the impediment vehicle within the predetermined period of time and the running track of the impediment vehicle comprises: determining a second mapping relation of the impediment vehicle according to the state information of the impediment vehicle within the predetermined period of time and the running track of the impediment vehicle, the second mapping relation being a mapping relation from the traffic scene information of the impediment vehicle to the running track of the impediment vehicle; segmenting the running track of the impediment vehicle along a time axis to obtain track segments of the impediment vehicle; filtering out an effective track segment of the impediment vehicle from the track segments of the impediment vehicle; learning a third mapping relation using an unsupervised learning method, the third mapping relation being a mapping relation from the effective track segment of the impediment vehicle to the driving behavior information of the impediment vehicle; and determining the first mapping relation using a supervised learning method based on the second mapping relation and the third mapping relation.

In some embodiments, segmenting the running track of the impediment vehicle along a time axis to obtain track segments of the impediment vehicle comprises: traversing all track points in the running track of the impediment vehicle and a track time length to determine the track segments.

In some embodiments, filtering out an effective track segment of the impediment vehicle from the track segments of the impediment vehicle comprises: evaluating the track segments using an evaluation function; and determining the track segment as the effective track segment in response to an evaluated value being greater than a threshold value.

In some embodiments, generating the autonomous driving strategy of the instant vehicle based on the first mapping relation, the road structure information, the state information of the instant vehicle and the traffic scene information of the instant vehicle comprises: determining the driving behavior information of the impediment vehicle corresponding to the traffic scene information of the instant vehicle in the first mapping relation as driving behavior information of the instant vehicle; establishing an inverse mapping relation of the third mapping relation to obtain a fourth mapping relation;

determining the running track of the impediment vehicle corresponding to the driving behavior information of the instant vehicle in the fourth mapping relation as a running track of the instant vehicle; and optimizing the running track of the instant vehicle based on a pre-established running performance index function of an autonomous vehicle, the road structure information, the state information of the instant vehicle and the traffic scene information of the instant vehicle to obtain the driving strategy of the instant vehicle.

In a second aspect, an embodiment of the present disclosure provides an apparatus for generating an autonomous driving strategy, the apparatus comprising: an information measuring unit, configured to measure state information of the instant vehicle and ambient scene information, the ambient scene information comprising: state information of an impediment vehicle, road structure information, and traffic scene information of the instant vehicle; a running track determining unit, configured to determine a running track of the impediment vehicle according to the state information of the impediment vehicle within a predetermined period of time; a mapping relation determining unit, configured to determine a first mapping relation based on the state information of the impediment vehicle within the predetermined period of time and the running track of the impediment vehicle, the first mapping relation being a mapping relation from the traffic scene information of the impediment vehicle to driving behavior information of the impediment vehicle; and a driving strategy generating unit, configured to generate the autonomous driving strategy of the instant vehicle based on the first mapping relation, the road structure information, the state information of the instant vehicle and the traffic scene information of the instant vehicle.

In some embodiments, the mapping relation determining unit comprises: a scene track mapping unit, configured to determine a second mapping relation of the impediment vehicle according to the state information of the impediment vehicle within the predetermined period of time and the running track of the impediment vehicle, the second mapping relation being a mapping relation from the traffic scene information of the impediment vehicle to the running track of the impediment vehicle; a track segment segmenting unit, configured to segment the running track of the impediment vehicle along a time axis to obtain track segments of the impediment vehicle; an effective segment filtering unit, configured to filter out an effective track segment of the impediment vehicle from the track segments of the impediment vehicle; a mapping relation learning unit, configured to learn a third mapping relation using an unsupervised learning apparatus, the third mapping relation being a mapping relation from the effective track segment of the impediment vehicle to the driving behavior information of the impediment vehicle; and a unit for learning a mapping relation, configured to determine the first mapping relation using a supervised learning apparatus based on the second mapping relation and the third mapping relation.

In some embodiments, the track segment segmenting unit is further configured to traverse all track points in the running track of the impediment vehicle and a track time length to determine the track segments.

In some embodiments, the effective segment filtering unit is further configured to evaluate the track segments using an evaluation function, and determine the track segment as the effective track segment in response to an evaluated value being greater than a threshold value.

In some embodiments, the driving strategy generating unit comprises: a behavior information determining unit, configured to determine the driving behavior information of the impediment vehicle corresponding to the traffic scene information of the instant vehicle in the first mapping relation as driving behavior information of the instant vehicle; an inverse mapping relation establishing unit, configured to establish an inverse mapping relation of the third mapping relation to obtain a fourth mapping relation; a running track determining unit, configured to determine the running track of the impediment vehicle corresponding to the driving behavior information of the instant vehicle in the fourth mapping relation as a running track of the instant vehicle; and a running track optimizing unit, configured to optimize the running track of the instant vehicle based on a pre-established running performance index function of an autonomous vehicle, the road structure information, the state information of the instant vehicle and the traffic scene information of the instant vehicle to obtain the driving strategy of the instant vehicle.

In a third aspect, an embodiment of the present disclosure provides a device, comprising: one or more processors; and a storage apparatus, configured to store one or more programs. When the one or more programs are executed by the one or more processors, the one or more processors are caused to implement any one of the above methods for generating an autonomous driving strategy.

In a fourth aspect, an embodiment of the present disclosure provides a computer readable storage medium, storing a computer program. When the program is executed by the processor, any one of the above methods for generating an autonomous driving strategy is implemented.

In a fifth aspect, an embodiment of the present disclosure provides an autonomous vehicle, which comprises any one of the above apparatuses for generating an autonomous driving strategy.

According to the method and apparatus for generating an autonomous driving strategy provided by the embodiments of the present disclosure, state information of the instant vehicle and ambient scene information are first measured, the ambient scene information comprising: state information of an impediment vehicle, road structure information, and traffic scene information of the instant vehicle. Next, a running track of the impediment vehicle is determined according to the state information of the impediment vehicle within a predetermined period of time. Next, a first mapping relation is determined based on the state information of the impediment vehicle within the predetermined period of time and the running track of the impediment vehicle, the first mapping relation being a mapping relation from the traffic scene information of the impediment vehicle to driving behavior information of the impediment vehicle. Finally the autonomous driving strategy of the instant vehicle is generated based on the first mapping relation, the road structure information, the state information of the instant vehicle and the traffic scene information of the instant vehicle. The driving strategy of the instant vehicle generated in this embodiment may be learned from running information of the instant vehicle and surrounding vehicles, which increases driver samples, traffic scene samples and road structure samples, and expands learning space. The driving strategy obtained by learning can be more widely applied to roads and scenes. Moreover, under the scene that the instant vehicle is not learned, because the instant vehicle and the surrounding vehicles are the same in driving road structure and similar in traffic scene, the driving strategy and the running track suitable for the instant vehicle may be easily learned by learning the driving strategies of the surrounding vehicles, so that the strategy correctness and the driving safety are guaranteed.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Technically, the implementation of the autonomous vehicle generally is divided into three layers: a perception layer, a decision layer and a control layer. The perception layer measures state information of the instant vehicle and ambient scene information, for example, objective information such as state information (including position, velocity and orientation) of an impediment, road structure information, and traffic scene information of the instant vehicle using sensors such as laser radar, millimeter-wave radar, camera or GPS. The decision layer decides which strategy (e.g., changing lanes to left or right, avoidance, acceleration and deceleration) and corresponding running tracks based on the state information of the instant vehicle and the ambient scene information obtained by measuring by the perception layer so as to drive to a destination safely and comfortably. The control layer controls an accelerator or a brake force and a steering wheel angle by taking a decision track as a downstream control input, so that the instant vehicle runs along a scheduled track.

As a core layer of the autonomous vehicle, the decision layer needs to consider the state information of the instant vehicle, the state information of surrounding impediments, the road structure information, a target position, a feasible strategy set, and results caused after the strategy is adopted and the like, and select the safest and most comfortable strategy therefrom as the decision.

Figure 1:
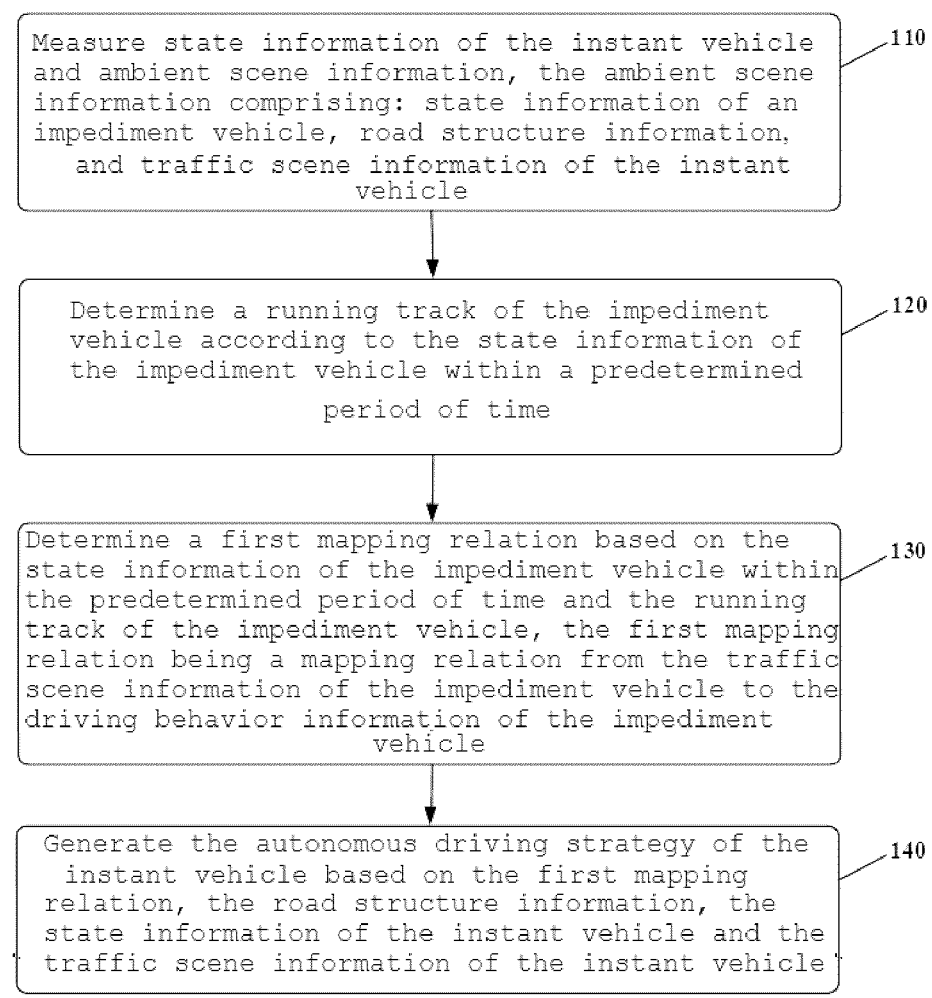
FIG. 1 is a schematic flowchart of a method for generating an autonomous driving strategy according to an embodiment of the present disclosure.

FIG. 1 illustrates a flowchart 100 of a method for generating an autonomous driving strategy according to an embodiment of the present disclosure. The method for generating an autonomous driving strategy includes following steps.

Step 110: measuring state information of an instant vehicle and ambient scene information, the ambient scene information comprising: state information of an impediment vehicle, road structure information, and traffic scene information of the instant vehicle.

In this embodiment, the perception layer of the autonomous vehicle measures the state information of the instant vehicle and the ambient scene information of the instant vehicle using sensors such as laser radar, millimeter-wave radar, camera or GPS. The ambient scene information comprises the state information of impediments around the instant vehicle, the road structure information and the traffic scene information of the instant vehicle. The state information may comprise position information, velocity information and orientation information, etc.

The impediment herein refer to objects around the instant vehicle and hindering the instant vehicle from running, for example, vehicles, pedestrians, median dividers and indication labels, etc. The impediment vehicle refers to a vehicle around the instant vehicle, consistent with or similar to the instant vehicle in running route and available for learning by the instant vehicle. The road structure, referring to a structure of a road, may comprise a lane, a median divider, a road shoulder, an intersection, a pedestrian crossing, various road indication signs and indication labels on the road. The traffic scene information comprises vehicles, pedestrians, traffic lights, and stations, etc.

Step 120: determining a running track of the impediment vehicle according to the state information of the impediment vehicle within a predetermined period of time.

In this embodiment, the predetermined period of time may be a preset period of time. The state information of the impediment vehicle within this period of time may be acquired to serve as a basis for generating the autonomous driving strategy. For example, the state information of the impediment vehicle within two minutes ahead of the current time may be acquired.

After the state information of the impediment vehicle within the predetermined period of time is acquired, the running track of the impediment vehicle may be determined based on the position, velocity and orientation of the impediment vehicle.

Step 130: determining a first mapping relation based on the state information of the impediment vehicle within the predetermined period of time and the running track of the impediment vehicle.

In this embodiment, the first mapping relation is a mapping relation from the traffic scene information of the impediment vehicle to the driving behavior information of the impediment vehicle. Herein the traffic scene information of the impediment vehicle may be determined based on the traffic scene information of the instant vehicle and the state information of the impediment vehicle. The driving behavior information of the impediment vehicle may be learned based on the running track of the impediment vehicle. The first mapping relation may be obtained by corresponding the traffic scene information of the impediment vehicle to the driving behavior information of the impediment vehicle which are at the same time point.

Step 140: generating the autonomous driving strategy of the instant vehicle based on the first mapping relation, the road structure information, the state information of the instant vehicle and the traffic scene information of the instant vehicle.

In this embodiment, after the first mapping relation is obtained, the driving behavior information corresponding to the traffic scene information of the instant vehicle may be queried from the first mapping relation, and then the autonomous driving strategy of the instant vehicle may be generated by combining the driving behavior information with the road structure information, the state information of the instant vehicle and the traffic scene information of the instant vehicle. Specifically, the autonomous driving strategy of the instant vehicle may be generated by combining the driving behavior information with the road structure information, the state information of the instant vehicle and the traffic scene information of the instant vehicle presetting a model, function or algorithm.

According to the method for generating an autonomous driving strategy provided by the above embodiment of the present disclosure, the driving strategy may be learned from running information of the instant vehicle and surrounding vehicles, which increases driver samples, traffic scene samples and road structure samples, and expands learning space. The driving strategy obtained by learning can be more widely applied to roads and scenes. Moreover, under the scene that the instant vehicle is not learned, because the instant vehicle and the surrounding vehicles are the same in driving road structure and similar in traffic scene, the driving strategy and the running track suitable for the instant vehicle may be easily learned by learning the driving strategies of the surrounding vehicles, so that the strategy correctness can be guaranteed.

Figure 2:
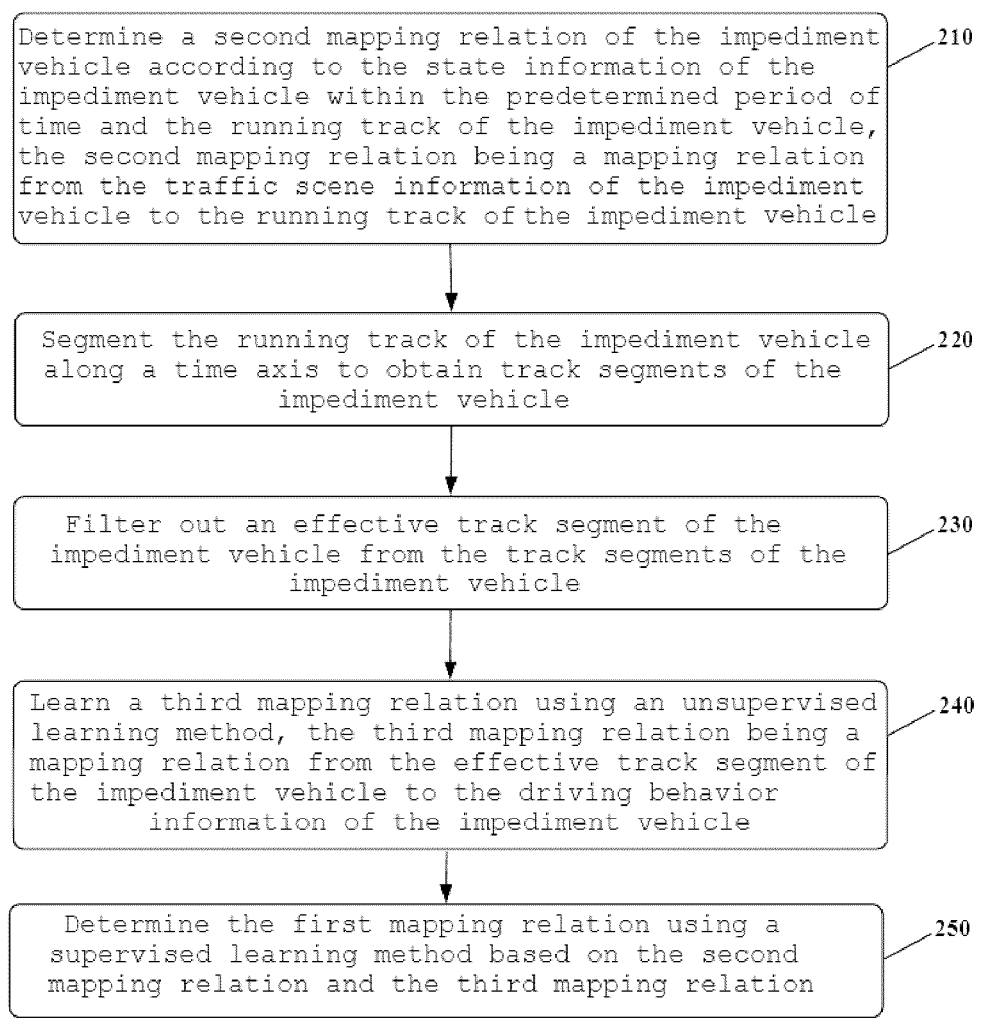
FIG. 2 is a schematic flowchart of a method for determining a first mapping relation according to an embodiment of the present disclosure.

Further, referring to FIG. 2, which illustrates a schematic flowchart of a method for determining a first mapping relation according to an embodiment of the present disclosure.

As shown in FIG. 2, the method 200 for determining a first mapping relation comprises following steps.

Step 210: determining a second mapping relation of the impediment vehicle according to the state information of the impediment vehicle within the predetermined period of time and the running track of the impediment vehicle.

In this embodiment, the second mapping relation is a mapping relation from the traffic scene information of the impediment vehicle to the running track of the impediment vehicle. Herein, the traffic scene information of the impediment vehicle may be obtained by combining the state information of the impediment vehicle within the predetermined period of time with the traffic scene information of the instant vehicle. The second mapping relation may be obtained by corresponding the traffic scene information of the impediment vehicle to the running track information of the impediment vehicle.

Step 220: segmenting the running track of the impediment vehicle along a time axis to obtain track segments of the impediment vehicle.

In this embodiment, the running track of the impediment vehicle comprises track points and time points corresponding to these track points. The track segments of the impediment vehicle may be obtained by segmenting the running track of the impediment vehicle along the time axis based on these track points and time points corresponding to these track points. These track segments contain complete driving behavior characteristics.

In some optional implementations of this embodiment, all the track points in the running track of the impediment vehicle and a track time length are traversed to determine the track segments.

In this implementation, the track time length refers to a time length between two time points corresponding to two track points. For the recorded running track, two time points on the track are traversed, and all the track points between the two time points may be intercepted to constitute a track segment.

Step 230: filtering out an effective track segment of the impediment vehicle from the track segments of the impediment vehicle.

In this embodiment, the effective track segment is obtained by filtering from the track segments of the impediment vehicle using a preset effective track filtering rule.

In some optional implementations of this embodiment, filtering out an effective track segment of the impediment vehicle from the track segments of the impediment vehicle comprises: evaluating the track segments using an evaluation function; and determining the track segment as the effective track segment in response to an evaluated value being greater than a threshold value. That is, when the evaluated value is greater than the threshold value, it is considered that the track segment contains enough driving behavior characteristics.

Step 240: learning a third mapping relation using an unsupervised learning method.

In this embodiment, the third mapping relation is a mapping relation from the effective track segment of the impediment vehicle to the driving behavior information of the impediment vehicle.

The unsupervised learning method herein may be an unsupervised learning method in the prior art or future developed technologies, for example, auto-encoder, clustering, and Restricted Boltzmann Machine, etc. The driving behavior information may be obtained by learning the effective track segment using the unsupervised learning method, thereby obtaining the mapping relation from the effective track segment to the driving behavior information.

Step 250: determining the first mapping relation using a supervised learning method based on the second mapping relation and the third mapping relation.

In this embodiment, the second mapping relation is a mapping relation from the traffic scene information of the impediment vehicle to the running track of the impediment vehicle, and the third mapping relation is a mapping relation from the effective track segment of the impediment vehicle to the driving behavior information of the impediment vehicle. The first mapping relation may be determined according to a corresponding relation between the effective track segment in the second mapping relation and the effective track segment in the third mapping relation. That is, the mapping relation from the traffic scene information of the impediment vehicle to the driving behavior information of the impediment vehicle is determined.

The supervised learning method herein may be a supervised learning method in the prior art or future developed technologies, for example, Deep Neural Networks, decision tree, and multilayer perceptron, etc.

According to the method for determining a first mapping relation provided by the above embodiment of the present disclosure, a learning sample is provided for generating the autonomous driving strategy of the instant vehicle in the subsequent decision by way of the mapping relation between the traffic scene information of the impediment vehicle and the driving behavior information of the impediment vehicle, decision parameters of the decision layer are expanded, and capability of learning a driving strategy fit for the instant vehicle is enhanced.

Figure 3:
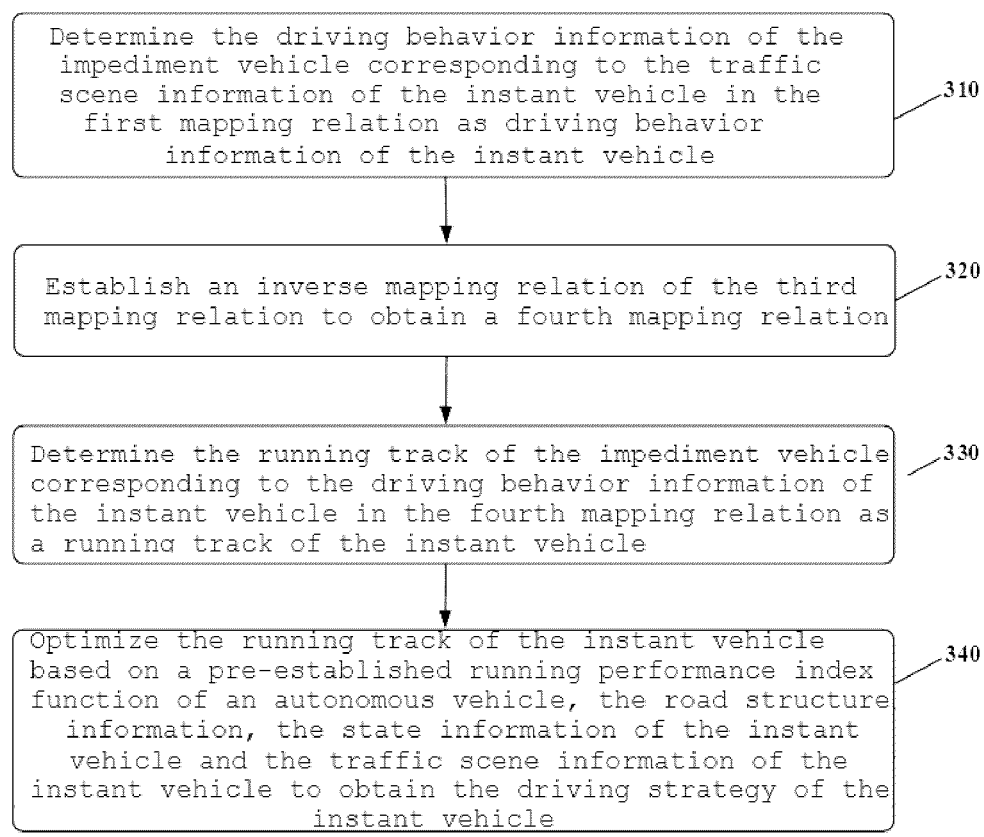
FIG. 3 illustrates a schematic flowchart of a method for generating an autonomous driving strategy based on the first mapping relation in FIG. 2 according to an embodiment.

Further referring to FIG. 3, which illustrates a schematic flowchart of a method for generating an autonomous driving strategy based on the first mapping relation in FIG. 2 according to an embodiment.

As shown in FIG. 3, the method 300 for generating an autonomous driving strategy based on the first mapping relation in FIG. 2 comprises following steps.

Step 310: determining the driving behavior information corresponding to the traffic scene information of the instant vehicle in the first mapping relation as driving behavior information of the instant vehicle.

In this embodiment, the first mapping relation is a mapping relation from the traffic scene information of the impediment vehicle to the driving behavior information of the impediment vehicle. The traffic scene information of the impediment vehicle conforming to the traffic scene information of the instant vehicle may be queried from the first mapping relation, and the driving behavior information corresponding to the traffic scene information of the impediment vehicle is determined as the driving behavior information of the instant vehicle.

Step 320: establishing an inverse mapping relation of the third mapping relation to obtain a fourth mapping relation.

In this embodiment, when or after the third mapping relation is learned by using the unsupervised learning method in FIG. 2, the inverse mapping relation of the third mapping relation may be established to obtain the fourth mapping relation, that is, the mapping relation from the driving behavior information of the impediment vehicle to the effective track segment of the impediment vehicle is obtained.

Step 330: determining the running track of the impediment vehicle corresponding to the driving behavior information of the instant vehicle in the fourth mapping relation as a running track of the instant vehicle.

In this embodiment, the driving behavior information of the impediment vehicle conforming to the driving behavior information of the instant vehicle may be queried from the fourth mapping relation, and the running track of the impediment vehicle corresponding to the driving behavior information of the impediment vehicle may be determined as the running track of the instant vehicle.

Step 340: optimizing the running track of the instant vehicle based on a pre-established running performance index function of an autonomous vehicle, the road structure information, the state information of the instant vehicle and the traffic scene information of the instant vehicle to obtain the driving strategy of the instant vehicle.

In this embodiment, the driving behavior information extracted from the running tracks of the surrounding vehicles only can serve as a reference. An approximate decision strategy also needs to be determined in combination with states of the autonomous vehicle (including the road where the vehicle is, the orientation and the velocity) and circumstances of the surrounding impediments. The running track of the instant vehicle is obtained by performing an inverse operation of the unsupervised learning method according to strategy characteristics. Further, the optimal running track may be found by optimizing the running track of the instant vehicle after the decision based on a pre-established index function combining safety and comfort.

According to the method for generating the autonomous driving strategy based on the first mapping relationship provided by the above embodiment of the present disclosure, by continuously analyzing and learning the running tracks of the surrounding vehicles, the existing decision-making capacity is optimized combining with state characteristics. In this way, the capacity of the autonomous vehicle finishing the autonomous driving under various scenes is improved, and the driving performance index is enhanced.

An exemplary application scene of the method for generating an autonomous driving strategy according to the embodiments of the present disclosure is described in the following with reference to FIG. 4.

Figure 4:
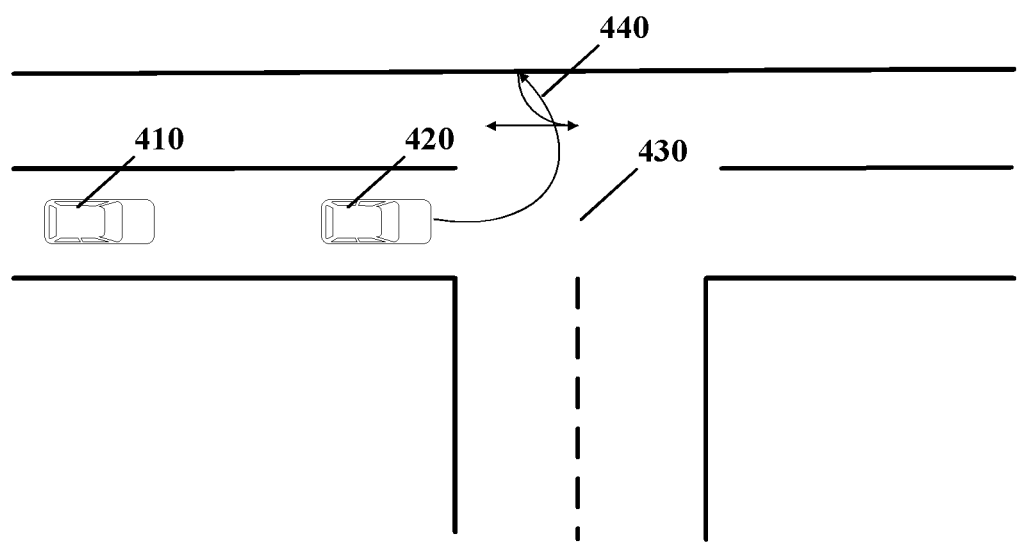
FIG. 4 is a schematic flowchart of an application scene of the method for generating an autonomous driving strategy according to embodiments of the present disclosure.

As shown in FIG. 4, which illustrates a schematic flowchart of an application scene of the method for generating an autonomous driving strategy according to embodiments of the present disclosure.

As shown in FIG. 4, the autonomous vehicle 410 learns, from the running track of the front impediment vehicle 420, how to turn round at an intersection.

In front of the autonomous vehicle 410, the impediment vehicle 420 consistent in running route with the instant vehicle exists. Turning round cannot be directly implemented since the intersection 430 is narrower. Therefore, the impediment vehicle 420 needs to back up so as to turn round. A turnround track of the impediment vehicle is as shown in a track 440 in the figure. In this process, the autonomous vehicle 410 records data such as position, velocity and orientation angle of the impediment vehicle 420, obtains, by learning, a turnround strategy fit for the autonomous vehicle 410 in combination with the road structure and the traffic scene around the autonomous vehicle 410 and the data such as position, velocity and orientation angle of the instant vehicle, and controls the accelerator, the brake force and the steering wheel angle according to the turnround strategy so that the autonomous vehicle 410 turns round at the intersection 430 based on the turnround strategy obtained by learning.

It should be understood that the application scene as shown in FIG. 4 merely is an exemplary application scene of the embodiment of the present disclosure, instead of limiting the present disclosure.

According to the method for generating an autonomous driving strategy provided by the above application scene of the present disclosure, the driving strategy may be learned from running information of the instant vehicle and surrounding vehicles, which increases driver samples, traffic scene samples and road structure samples, and expands learning space. The driving strategy obtained by learning can be more widely applied to roads and scenes.

Figure 5:
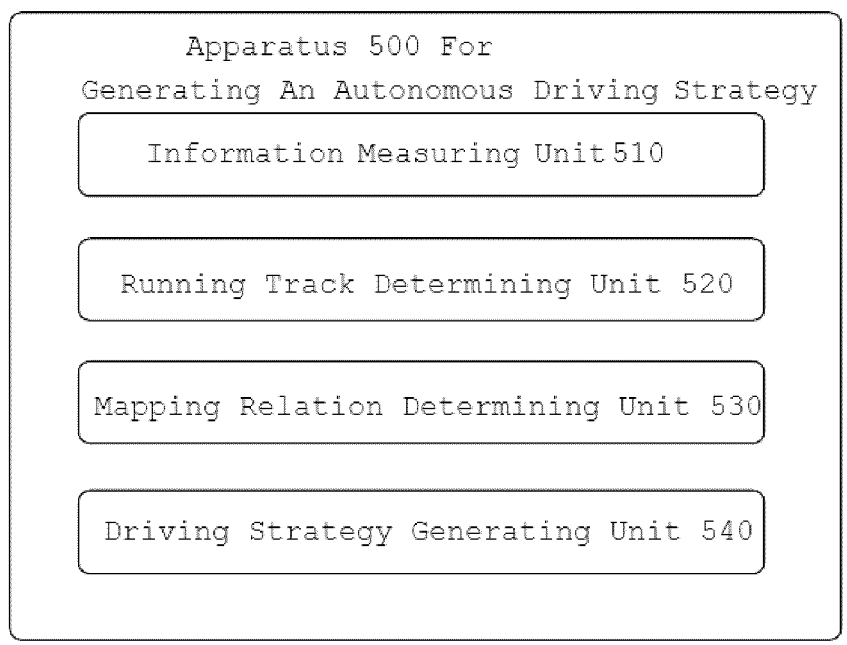
FIG. 5 is a schematic structural diagram of an apparatus for generating an autonomous driving strategy according to an embodiment of the present disclosure.

Further referring to FIG. 5, as an implementation of the foregoing method, embodiments of the present disclosure provide an embodiment of an apparatus for generating an autonomous driving strategy. The embodiment of the apparatus for generating an autonomous driving strategy corresponds to the embodiment of the method for generating an autonomous driving strategy as shown in FIG. 1 to FIG. 4. Thus, the operation and features described in the above method for generating an autonomous driving strategy as shown in FIG. 1 to FIG. 4 are also applicable to units included in the apparatus 500 for generating an autonomous driving strategy, which is not repeated any more herein.

As shown in FIG. 5, the apparatus 500 for generating an autonomous driving strategy includes: an information measuring unit 510, a running track determining unit 520, a mapping relation determining unit 530 and a driving strategy generating unit 540.

The information measuring unit 510 is configured to measure state information of the instant vehicle and ambient scene information, the ambient scene information comprising: state information of an impediment vehicle, road structure information, and traffic scene information of the instant vehicle. The running track determining unit 520 is configured to determine a running track of the impediment vehicle according to the state information of the impediment vehicle within a predetermined period of time. The mapping relation determining unit 530 is configured to determine a first mapping relation based on the state information of the impediment vehicle within the predetermined period of time and the running track of the impediment vehicle, the first mapping relation being a mapping relation from the traffic scene information of the impediment vehicle to driving behavior information of the impediment vehicle. The driving strategy generating unit 540 is configured to generate the autonomous driving strategy of the instant vehicle based on the first mapping relation, the road structure information, the state information of the instant vehicle and the traffic scene information of the instant vehicle.

In some optional implementations of this embodiment (not shown in the figure), the mapping relation determining unit comprises: a scene track mapping unit, configured to determine a second mapping relation of the impediment vehicle according to the state information of the impediment vehicle within the predetermined period of time and the running track of the impediment vehicle, the second mapping relation being a mapping relation from the traffic scene information of the impediment vehicle to the running track of the impediment vehicle; a track segment segmenting unit, configured to segment the running track of the impediment vehicle along a time axis to obtain track segments of the impediment vehicle; an effective segment filtering unit, configured to filter out an effective track segment of the impediment vehicle from the track segments of the impediment vehicle; a mapping relation learning unit, configured to learn a third mapping relation using an unsupervised learning apparatus, the third mapping relation being a mapping relation from the effective track segment of the impediment vehicle to the driving behavior information of the impediment vehicle; and a unit for learning a mapping relation, configured to determine the first mapping relation using a supervised learning apparatus based on the second mapping relation and the third mapping relation.

In some optional implementations of this embodiment (not shown in the figure), the track segment segmenting unit is further configured to traverse all track points in the running track of the impediment vehicle and a track time length to determine the track segments.

In some optional implementations of this embodiment (not shown in the figure), the effective segment filtering unit is further configured to: evaluate the track segments using an evaluation function; and determine the track segment as the effective track segment in response to an evaluated value being greater than a threshold value.

In some optional implementations of this embodiment (not shown in the figure), the driving strategy generating unit comprises: a behavior information determining unit, configured to determine the driving behavior information of the impediment vehicle corresponding to the traffic scene information of the instant vehicle in the first mapping relation as driving behavior information of the instant vehicle; an inverse mapping relation establishing unit, configured to establish an inverse mapping relation of the third mapping relation to obtain a fourth mapping relation; a running track determining unit, configured to determine the running track of the impediment vehicle corresponding to the driving behavior information of the instant vehicle in the fourth mapping relation as a running track of the instant vehicle; and a running track optimizing unit, configured to optimize the running track of the instant vehicle based on a pre-established running performance index function of an autonomous vehicle, the road structure information, the state information of the instant vehicle and the traffic scene information of the instant vehicle to obtain the driving strategy of the instant vehicle.

The present disclosure also provides an embodiment of a device, which comprises: one or more processors; and a storage apparatus, configured to store one or more programs. When the one or more programs are executed by the one or more processors, the one or more processors are caused to implement any one of the above methods for generating an autonomous driving strategy.

The present disclosure also provides an embodiment of a computer readable storage medium, storing a computer program. When the program is executed by the processor, any one of the above methods for generating an autonomous driving strategy is implemented.

The present disclosure also provides an embodiment of an autonomous vehicle, which comprises the apparatus for generating an autonomous driving strategy.

It should be appreciated that the first mapping relation, the second mapping relation, the third mapping relation and the fourth mapping relation in the above embodiments of the present disclosure merely represent four mapping relations having different mapping object, and do not represent particular limitations on the present disclosure. The first mapping relation is a mapping relation from the traffic scene information of the impediment vehicle to driving behavior information of the impediment vehicle. The second mapping relation is a mapping relation from the traffic scene information of the impediment vehicle to the running track of the impediment vehicle. The third mapping relation is a mapping relation from the effective track segment of the impediment vehicle to the driving behavior information of the impediment vehicle. The fourth mapping relation is the driving behavior information of the impediment vehicle to the effective track segment of the impediment vehicle.

Figure 6:
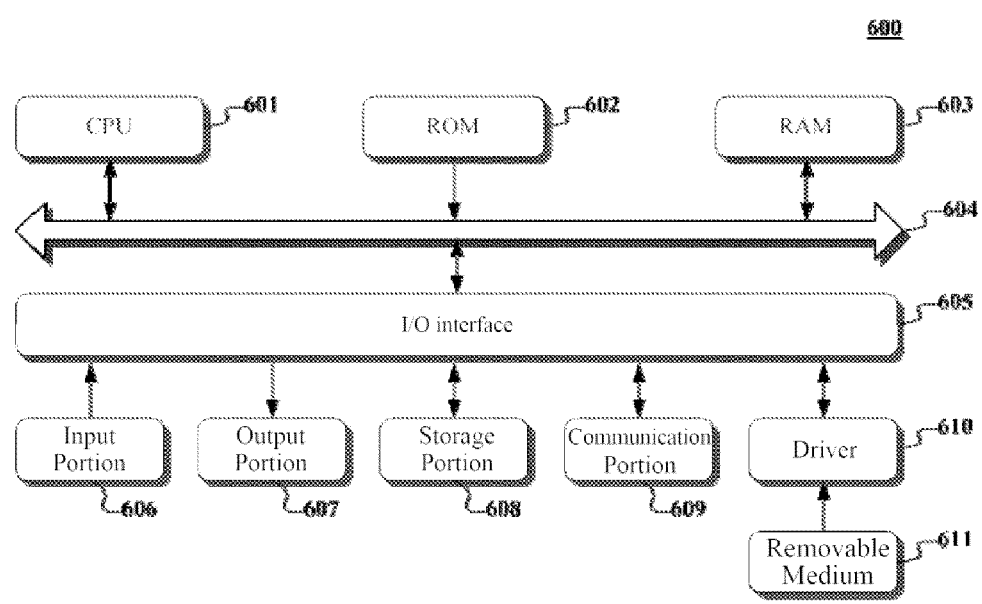
FIG. 6 illustrates a structural schematic diagram of a computer system adapted to implement a terminal device or a server of the embodiments of the present disclosure.

Referring to FIG. 6, a schematic structural diagram of a computer system 600 adapted to implement a terminal device or a server of the embodiments of the present application is shown. The terminal device shown in FIG. 6 is only an example, rather than limiting the functions and the using range of the application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

It is to be noted that the computer readable medium in the present application may be computer readable signal medium or computer readable storage medium or the combination thereof. An example of the computer readable storage medium may include but not limited to: systems, devices or elements of electric, magnet, light, electromagnet, infrared ray, or semiconductor or the combination thereof. A more specific example of the computer readable storage medium may include but not limited to: electrical connections with one or more wire, portable computer disk, hard disk, random access memory (RAM), read only memory (ROM), erasable programmable read only memory (EPROM or flash memory), fibre, portable compact disk read only memory (CD-ROM), optical memory, magnet memory or the combination thereof. In the present application, the computer readable storage medium may be any physical medium containing or storing programs which can be used by a command execution system, a device or an elements or the incorporation thereof. In the present application, the computer readable signal medium may include data signal in the base band or propagating as parts of a carrier in which computer readable program codes are carried. A form of the propagated signal may include but not limited to: electromagnetic signal, optical signal or the combination thereof. The signal medium that can be read by computer may be any computer readable medium except for computer readable storage medium. The computer readable medium is capable of emitting, propagating or transmitting programs for an instruction execution system, a device or an element or the combination thereof. The program codes on the computer readable medium may be transported with any suitable medium including but not limited to: a wireless medium, a wire medium, an optical cable medium, a RF medium or any combination thereof.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an information measuring unit, a running track determining unit, a mapping relation determining unit, and a driving strategy generating unit, where the names of these units or modules are not considered as a limitation to the units or modules. For example, the information measuring unit may also be described as "a unit for measuring state information of an instant vehicle and ambient scene information."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: measure state information of an instant vehicle and ambient scene information, the ambient scene information comprising: state information of an impediment vehicle, road structure information, and traffic scene information of the instant vehicle; determine a running track of the impediment vehicle according to the state information of the impediment vehicle within a predetermined period of time; determine a first mapping relation based on the state information of the impediment vehicle within the predetermined period of time and the running track of the impediment vehicle, the first mapping relation being a mapping relation from the traffic scene information of the impediment vehicle to driving behavior information of the impediment vehicle; and generate the autonomous driving strategy of the instant vehicle based on the first mapping relation, the road structure information, the state information of the instant vehicle and the traffic scene information of the instant vehicle.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for generating an autonomous driving strategy, comprising:
    measuring state information of an instant vehicle and ambient scene information, the ambient scene information comprising: state information of an impediment vehicle, road structure information, and traffic scene information of the instant vehicle;
    determining a running track of the impediment vehicle according to the state information of the impediment vehicle within a predetermined period of time;

determining a first mapping relation based on the state information of the impediment vehicle within the predetermined period of time and the running track of the impediment vehicle, the first mapping relation being a mapping relation from the traffic scene information of the impediment vehicle to driving behavior information of the impediment vehicle; and generating the autonomous driving strategy of the instant vehicle based on the first mapping relation, the road structure information, the state information of the instant vehicle and the traffic scene information of the instant vehicle, wherein the determining a first mapping relation based on the state information of the impediment vehicle within the predetermined period of time and the running track of the impediment vehicle comprises:

determining a second mapping relation of the impediment vehicle according to the state information of the impediment vehicle within the predetermined period of time and the running track of the impediment vehicle, the second mapping relation being a mapping relation from the traffic scene information of the impediment vehicle to the running track of the impediment vehicle;

segmenting the running track of the impediment vehicle along a time axis to obtain track segments of the impediment vehicle;

filtering out an effective track segment of the impediment vehicle from the track segments of the impediment vehicle;

learning a third mapping relation using an unsupervised learning method, the third mapping relation being a mapping relation from the effective track segment of the impediment vehicle to the driving behavior information of the impediment vehicle; and determining the first mapping relation using a supervised learning method based on the second mapping relation and the third mapping relation.

2. The method according to claim 1, wherein the segmenting the running track of the impediment vehicle along a time axis to obtain track segments of the impediment vehicle comprises:

traversing all track points in the running track of the impediment vehicle and a track time length to determine the track segments.

3. The method according to claim 1, wherein the filtering out an effective track segment of the impediment vehicle from the track segments of the impediment vehicle comprises:

evaluating the track segments using an evaluation function; and determining the track segment as the effective track segment in response to an evaluated value being greater than a threshold value.

4. The method according to claim 1, wherein the generating the autonomous driving strategy of the instant vehicle based on the first mapping relation, the road structure information, the state information of the instant vehicle and the traffic scene information of the instant vehicle comprises:

determining the driving behavior information of the impediment vehicle corresponding to the traffic scene information of the instant vehicle in the first mapping relation as driving behavior information of the instant vehicle;

establishing an inverse mapping relation of the third mapping relation to obtain a fourth mapping relation;

determining the running track of the impediment vehicle corresponding to the driving behavior information of the instant vehicle in the fourth mapping relation as a running track of the instant vehicle; and optimizing the running track of the instant vehicle based on a pre-established running performance index function of an autonomous vehicle, the road structure information, the state information of the instant vehicle and the traffic scene information of the instant vehicle to obtain the driving strategy of the instant vehicle.

5. An apparatus for generating an autonomous driving strategy, comprising:

at least one processor; and a memory storing instructions, which when executed by the at least one processor, cause the at least one processor to perform operations, the operations comprising:

measuring state information of an instant vehicle and ambient scene information, the ambient scene information comprising: state information of an impediment vehicle, road structure information, and traffic scene information of the instant vehicle;

determining a running track of the impediment vehicle according to the state information of the impediment vehicle within a predetermined period of time;

determining a first mapping relation based on the state information of the impediment vehicle within the predetermined period of time and the running track of the impediment vehicle, the first mapping relation being a mapping relation from the traffic scene information of the impediment vehicle to driving behavior information of the impediment vehicle; and generating the autonomous driving strategy of the instant vehicle based on the first mapping relation, the road structure information, the state information of the instant vehicle and the traffic scene information of the instant vehicle, wherein the determining a first mapping relation based on the state information of the impediment vehicle within the predetermined period of time and the running track of the impediment vehicle comprises:

determining a second mapping relation of the impediment vehicle according to the state information of the impediment vehicle within the predetermined period of time and the running track of the impediment vehicle, the second mapping relation being a mapping relation from the traffic scene information of the impediment vehicle to the running track of the impediment vehicle;

segmenting the running track of the impediment vehicle along a time axis to obtain track segments of the impediment vehicle;

filtering out an effective track segment of the impediment vehicle from the track segments of the impediment vehicle;

learning a third mapping relation using an unsupervised learning apparatus, the third mapping relation being a mapping relation from the effective track segment of the impediment vehicle to the driving behavior information of the impediment vehicle; and determining the first mapping relation using a supervised learning apparatus based on the second mapping relation and the third mapping relation.

6. The apparatus according to claim 5, wherein the segmenting the running track of the impediment vehicle along a time axis to obtain track segments of the impediment vehicle comprises:

traversing all track points in the running track of the impediment vehicle and a track time length to determine the track segments.

7. The apparatus according to claim 5, wherein the filtering out an effective track segment of the impediment vehicle from the track segments of the impediment vehicle comprises:
evaluating the track segments using an evaluation function; and
determining the track segment as the effective track segment in response to an evaluated value being greater than a threshold value.

8. The apparatus according to claim 5, wherein the generating the autonomous driving strategy of the instant vehicle based on the first mapping relation, the road structure information, the state information of the instant vehicle and the traffic scene information of the instant vehicle comprises:
determining the driving behavior information of the impediment vehicle corresponding to the traffic scene information of the instant vehicle in the first mapping relation as driving behavior information of the instant vehicle;
establishing an inverse mapping relation of the third mapping relation to obtain a fourth mapping relation;
determining the running track of the impediment vehicle corresponding to the driving behavior information of the instant vehicle in the fourth mapping relation as a running track of the instant vehicle; and
optimizing the running track of the instant vehicle based on a pre-established running performance index function of an autonomous vehicle, the road structure information, the state information of the instant vehicle and the traffic scene information of the instant vehicle to obtain the driving strategy of the instant vehicle.

9. A non-transitory computer readable storage medium, storing a computer program, which when executed by one or more processors, causes the one or more processors to perform operations, the operations comprising:
measuring state information of an instant vehicle and ambient scene information, the ambient scene information comprising: state information of an impediment vehicle, road structure information, and traffic scene information of the instant vehicle;
determining a running track of the impediment vehicle according to the state information of the impediment vehicle within a predetermined period of time;
determining a first mapping relation based on the state information of the impediment vehicle within the predetermined period of time and the running track of the impediment vehicle, the first mapping relation being a mapping relation from the traffic scene information of the impediment vehicle to driving behavior information of the impediment vehicle; and
generating the autonomous driving strategy of the instant vehicle based on the first mapping relation, the road structure information, the state information of the instant vehicle and the traffic scene information of the instant vehicle,
wherein the determining a first mapping relation based on the state information of the impediment vehicle within the predetermined period of time and the running track of the impediment vehicle comprises:
determining a second mapping relation of the impediment vehicle according to the state information of the impediment vehicle within the predetermined period of time and the running track of the impediment vehicle, the second mapping relation being a mapping relation from the traffic scene information of the impediment vehicle to the running track of the impediment vehicle;
segmenting the running track of the impediment vehicle along a time axis to obtain track segments of the impediment vehicle;
filtering out an effective track segment of the impediment vehicle from the track segments of the impediment vehicle;
learning a third mapping relation using an unsupervised learning apparatus, the third mapping relation being a mapping relation from the effective track segment of the impediment vehicle to the driving behavior information of the impediment vehicle; and
determining the first mapping relation using a supervised learning apparatus based on the second mapping relation and the third mapping relation.

* * * * *